(12) United States Patent
Perotto et al.

(10) Patent No.: US 7,959,216 B2
(45) Date of Patent: Jun. 14, 2011

(54) DEVICE FOR REINFORCING A HOLLOW STRUCTURAL ELEMENT

(75) Inventors: Christian Perotto, Ergue Gaberic (FR); Francaise Perotto, legal representative, Rue de Kerellou (FR); Nicholas Dubois, Crozon (FR)

(73) Assignee: Autoliv Development AB, Vargarda (SE)

( * ) Notice: Subject to any disclaimer, the term of this patent is extended or adjusted under 35 U.S.C. 154(b) by 114 days.

(21) Appl. No.: 11/920,106

(22) PCT Filed: May 9, 2006

(86) PCT No.: PCT/EP2006/062151
§ 371 (c)(1),
(2), (4) Date: Nov. 8, 2007

(87) PCT Pub. No.: WO2006/120189
PCT Pub. Date: Nov. 16, 2006

(65) Prior Publication Data
US 2008/0174148 A1    Jul. 24, 2008

(30) Foreign Application Priority Data
May 12, 2005   (FR) ...................................... 05 04756

(51) Int. Cl.
*B60R 19/02* (2006.01)
(52) U.S. Cl. .................................................. 296/187.03
(58) Field of Classification Search ............. 296/187.06; 280/741, 728.1, 736, 734, 735; 293/102, 293/116, 118, 132, 133
See application file for complete search history.

(56) References Cited

U.S. PATENT DOCUMENTS 4,050,537 A * 9/1977 Bez ................................ 180/274
(Continued)

FOREIGN PATENT DOCUMENTS

DE   10 022 094 A   12/2001
(Continued)

OTHER PUBLICATIONS

International Preliminary Report on Patentability and Written Opinion for Application No. PCT/EP2006/062151, issued Nov. 13, 2007.
(Continued)

*Primary Examiner* — H Gutman
(74) *Attorney, Agent, or Firm* — Harness, Dickey & Pierce, P.L.C.

(57) ABSTRACT

The present invention provides in particular a device for reinforcing a hollow motor vehicle bodywork element (1) of closed right section, the device being characterized by the fact that said element (1) has means (2; 3; 5) suitable for subjecting its inside space (E) to a shock wave or pressure wave on detecting an impact, such that the energy generated by said wave is sufficient to deform the element by increasing its section.

11 Claims, 3 Drawing Sheets

U.S. PATENT DOCUMENTS

| | | | |
|---|---|---|---|
| 5,219,197 A * | 6/1993 | Rich et al. | 293/120 |
| 5,382,051 A | 1/1995 | Glance | |
| 5,615,914 A | 4/1997 | Galbraith et al. | |
| 5,845,937 A | 12/1998 | Smith | |
| 5,934,743 A | 8/1999 | Nohr | |
| 6,273,453 B1 | 8/2001 | Satzger et al. | |
| 6,997,490 B2 * | 2/2006 | Evans et al. | 293/120 |
| 7,264,271 B2 * | 9/2007 | Barvosa-Carter et al. | 280/751 |
| 7,401,823 B2 * | 7/2008 | Cate et al. | 293/120 |
| 2002/0149214 A1 * | 10/2002 | Evans | 293/120 |
| 2003/0075909 A1 | 4/2003 | Lebaudy et al. | |
| 2005/0035609 A1 * | 2/2005 | Cate et al. | 293/120 |
| 2010/0194127 A1 * | 8/2010 | Muller et al. | 293/133 |

FOREIGN PATENT DOCUMENTS

| | | |
|---|---|---|
| EP | 1 885 581 B1 | 10/2009 |
| GB | 2 362 138 A | 11/2001 |
| JP | 10 338590 | 12/1998 |
| JP | 2003 525106 | 8/2003 |
| JP | 2004 513013 | 4/2004 |
| WO | 01/34516 A | 5/2001 |

OTHER PUBLICATIONS

First Office Action regarding Chinese Application for Invention No. 200680016010.8, dated Jan. 9, 2009.

Search Report regarding Japanese Patent Application No. 2008-510565.

Pending claims in Japanese Patent Application No. 2008-510565.

* cited by examiner

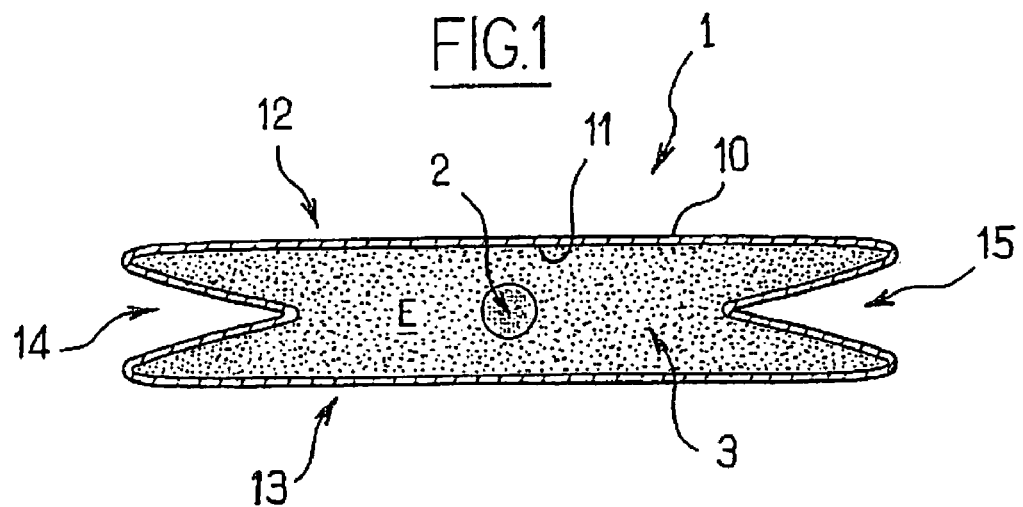
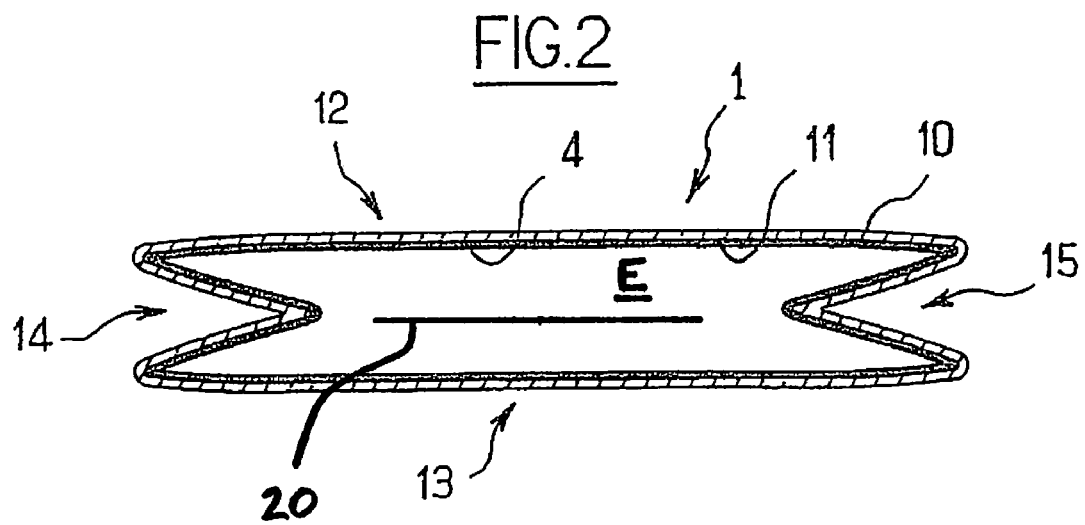
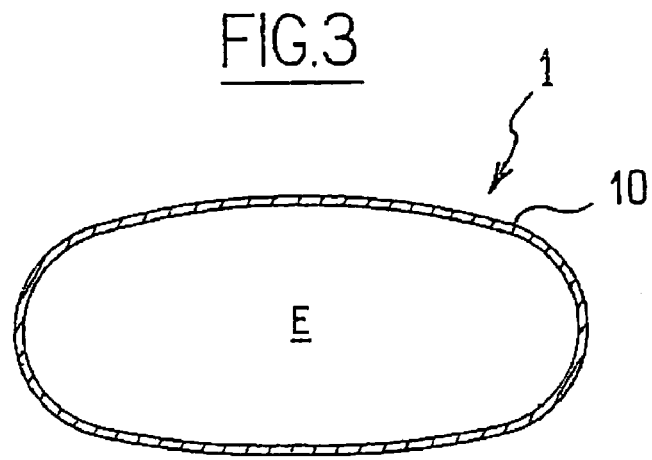

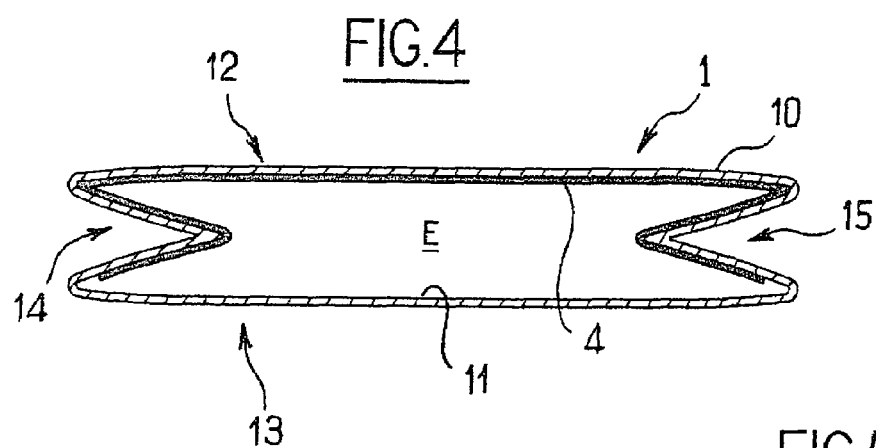
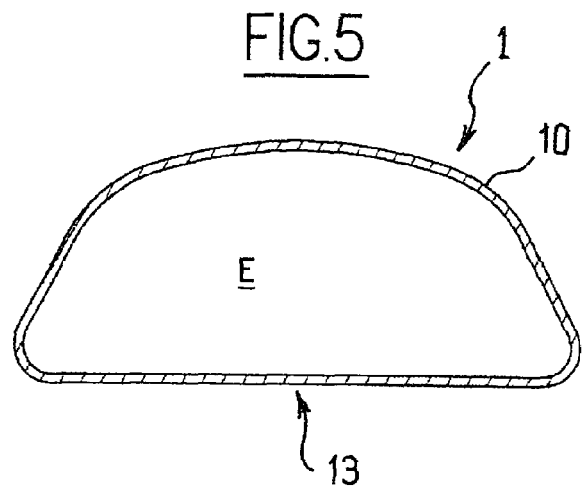
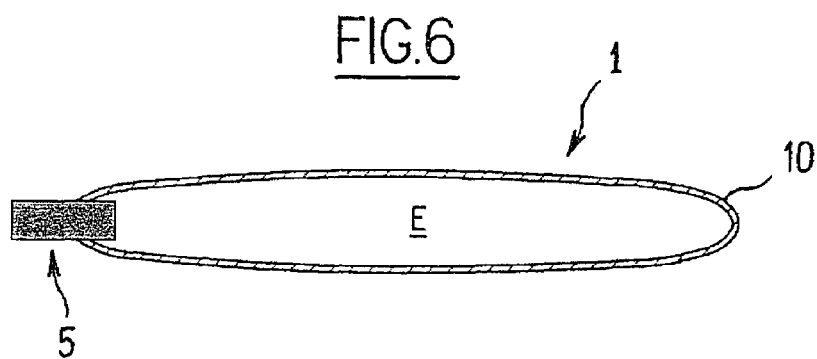
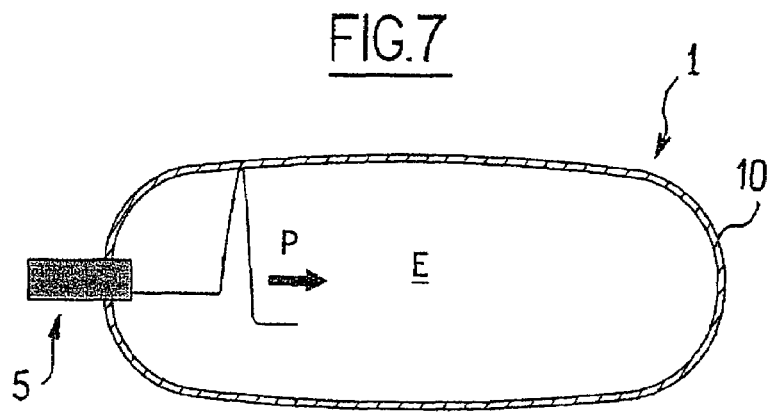

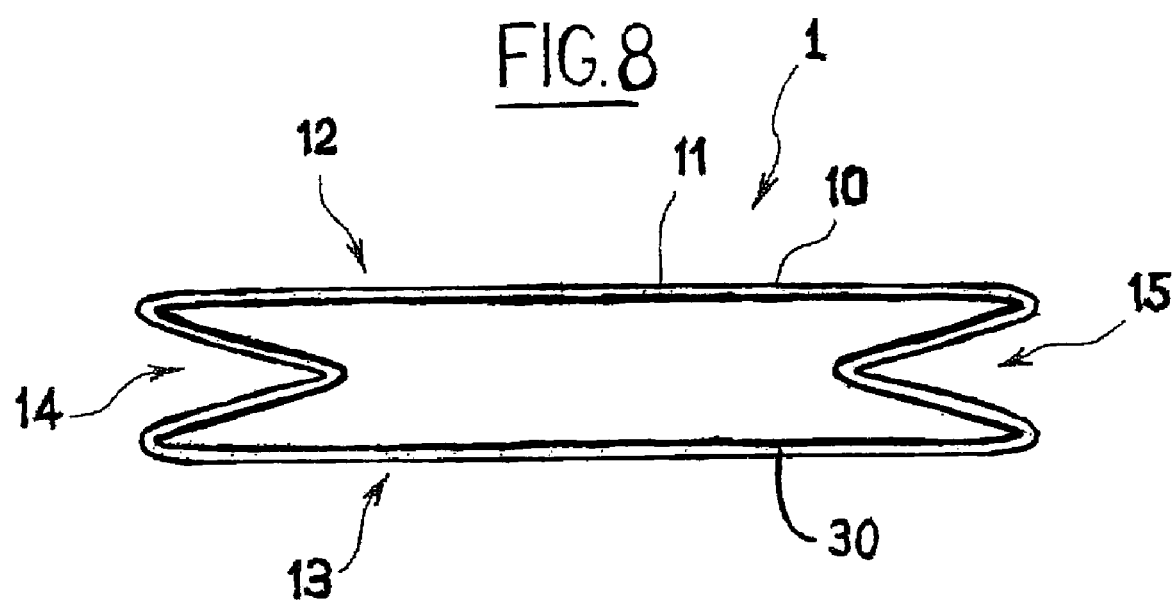

DEVICE FOR REINFORCING A HOLLOW STRUCTURAL ELEMENT

CROSS-REFERENCE TO RELATED APPLICATIONS

This application is a National Stage of International application No. PCT/EP2006/062151, filed May 9, 2006 and published in English as WO 2006/120189 A1 on Nov. 16, 2006. This application claims the benefit of foreign application FR 05/04756, filed May 12, 2005. The entire disclosures of the above applications are incorporated herein by reference.

FIELD

The present invention relates in particular to a device for reinforcing a hollow motor vehicle element, in such a manner as to increase its ability to absorb energy in the event of an impact.

BACKGROUND AND SUMMARY

A major desire presently expressed by motor vehicle manufacturers is to maximize capacity.

Thus, inside the cabin, manufacturers are seeking to increase the distance between two facing doors both for ergonomic and for stylistic reasons.

Naturally, one way of increasing capacity is to reduce the thickness of the door capping. However that must be done without nevertheless diminishing performance in terms of safety.

The term "door capping" is used herein to mean longitudinally extending members that extend parallel to the longitudinal axis of the vehicle and that are integrated in the thickness of the door. These are hollow elements, generally constituted by assembling together two sections, and they contribute in non-negligible manner to absorbing a fraction of the energy received by the door during an impact that results from a collision.

In such a lateral impact, the involvement of the door capping in absorbing energy is variable.

Given the various types of impact, it can be advantageous to adapt the stiffness of the structure so as to optimize its capacity to absorb impact energy.

Thus, in the event of a relatively gentle lateral impact, it is useful for the capping to retain its initial shape, whereas in the event of a more violent impact, it is essential for the energy absorption capacities of the capping to be increased.

Documents U.S. Pat. No. 5,382,051, DE-A-10 022 094, GB-A-2 362 138, U.S. Pat. No. 5,845,937, and U.S. Pat. No. 5,615,914 describe systems that enable integral or fitted elements of the bodywork of a motor vehicle to deform in such a manner as to increase their capacity for absorbing energy in the event of an impact being detected.

To do this, those elements have their moment of inertia increased by increasing their section. The systems implemented also make provision for this increase in section to be obtained by increasing the pressure inside the element. The increase in pressure is obtained by producing gas as a result of the combustion of a pyrotechnic material.

In practice, the technique implemented is similar to that which is encountered when inflating an airbag.

A first drawback that results from that practice is that the pressure inside the element must increase sufficiently to deform the structure. Consequently, a large quantity of gas must be generated, which likewise requires a large quantity of pyrotechnic material.

In addition, when the walls of the element deform as a result of the increase in pressure, it is necessary to continue to produce the gas in order to compensate for the increase in volume.

Under such conditions, the time that elapses between detecting an impact and the bodywork element being effectively deformed is of the order of about ten to a few tens of milliseconds.

Unfortunately, that time is too long for said deformation to have full effectiveness.

The present invention seeks to mitigate those drawbacks, while relying on technology that is simple, and that does not depart completely from the means that have been used until now.

A first aspect of the present invention thus relates to a device for reinforcing a hollow motor vehicle bodywork element of closed right section, the device being characterized by the fact that said element has means suitable for subjecting its inside space to a shock wave or pressure wave on detecting an impact, such that the energy generated by said wave is sufficient to deform the element by increasing its section.

According to other characteristics of the device that are advantageous but not limiting: said means comprise a pyrotechnic material; said pyrotechnic material is in the form of at least one detonating or deflagrating cord; said pyrotechnic material is in the form of an explosive coating applied to its inside surface; it is coupled to a gas generator containing said pyrotechnic material, the gas generated by the combustion of said material being released into said element, the resulting pressure wave inside said element being sufficient on its own to deform the element by increasing its section; and it includes means for stiffening the hollow element after it has deformed.

A second aspect of the present invention relates to a method of deforming a hollow motor vehicle bodywork element, said element being of closed right section, in such a manner as to increase its capacity to absorb energy during an impact.

The method is essentially characterized by the fact that, on detecting said impact, it consists in subjecting the inside space of the element to a shock or pressure wave, such that the energy generated by said wave is sufficient to deform the element by increasing its section.

This wave which manifests a pressure difference propagates in a very short length of time, of the order of one to a few milliseconds, typically of the order of less than five milliseconds.

This duration makes the deformation of the element fully effective in its capacity to absorb a large quantity of energy resulting from an impact.

According to other characteristics of the method that are advantageous but not limiting: said wave is generated by using a pyrotechnic material; said wave is generated by means of at least one detonating or deflagrating cord placed in the inside space of said element; said inside space is lined with a solid padding material in which said cord is placed; said padding material is a polymer, a granular medium, or a foam; said wave is generated using an explosive coating applied to the inside surface of said element; said coating is applied in register solely with the or each zone of the inside surface of said element that is to be deformed; and a gas generator is used that contains said pyrotechnic material, the gas generated by combustion of said material being released into said element, the pressure wave as obtained in this way inside said element sufficing on its own to deform the element by increasing its section.

DRAWINGS

Other characteristics and advantages of the invention appear on reading the following detailed description of certain embodiments. This description given by way non-limiting example is made with reference to the accompanying figures, in which:

FIG. 1 is a cross-section of an embodiment of a piece of motor vehicle door capping, within which a detonating cord is integrated, shown prior to deformation;

FIGS. 2 and 3 are likewise cross-section views of capping, respectively before and after deformation, its inside surface being covered with an explosive coating;

FIGS. 4 and 5 are similar to the two preceding figures except that the explosive coating is applied to only a fraction of the inside surface of the capping;

FIGS. 6 and 7 are views, likewise in cross-section, of capping, respectively before and after deformation, the capping being connected to a pressure wave pyrotechnic gas generator; and FIG. 8 is an end view of an embodiment of a piece of motor vehicle door capping, shown prior to deformation.

DETAILED DESCRIPTION

The description below is given essentially with reference to car door capping. However the present invention applies equally well to any hollow motor vehicle bodywork element, said element having a closed right section.

The term "hollow element having a closed right section" is used to mean any element, in one piece or constituted by a plurality of distinct parts that are assembled together, e.g. by welding, in which its structure is such that its perimeter is closed. For example that excludes open parts that are generally C-shaped in which the opposite ends of its section are spaced apart from each other. However such an element may have opposite ends 30 in the longitudinal direction that are open.

A "hollow element" is understood as being constituted by a part which, once it has been fabricated, includes an inside space that is empty, but that does not mean that said internal space cannot be subsequently filled in with some other material.

The method of the invention consists essentially in subjecting the inside space of the element to a shock wave or pressure wave as soon as said impact is detected, in such a manner that the energy generated by the wave is sufficient to deform the element so as to increase its section. A pyrotechnic material is preferably used for generating the wave.

For this purpose, the structure of the element is deformed by using the deflagration or detonation of certain pyrotechnic substances, possibly while pressurizing the internal space of the element by supplying gas.

Combustion is said to be "deflagrating" when it propagates at a speed that is faster than the speed of sound in ambient air. It is said to be "detonating" when it propagates at a speed faster than the speed of sound in the explosive material.

A deflagration is an explosion of chemical type, in which the reaction zone propagates by thermal conductivity.

The process implemented is as follows: a particle of the burning substance heats the adjacent particles so their temperature increases. Above a certain temperature, these particles ignite and burn in turn, thereby heating adjacent particles, and so on. For a given composition, the propagation speed of a deflagration depends on a large number of factors, such as the mode of initiation, the confinement, ambient conditions, etc.

Detonation is an explosion of chemical type in which the reaction zone propagates by shock wave (or detonation wave).

On reaching a particle, the shock wave produces strong compression and consequently sudden heating of its material. This causes the particle to ignite and its combustion gives off the energy needed to sustain the shock wave, with this process being reproduced in the same manner on the adjacent particles. The propagation speed is a function of the nature of the explosive used.

The material may be initiated by thermal ignition, by priming (detonating impulse+thermal ignition), by impact (e.g. the impact due to the accident itself), or by friction.

With reference to FIG. 1, there can be seen a metal element or piece of capping 1 of circular right section in the form of a bellows. Its wall is referenced 10, and its inside surface is referenced 11. It presents two parallel faces 12 and 13 and two zigzag faces 14 and 15 extending towards each other. The faces 12 and 13 are for placing parallel to the longitudinal axis of the vehicle, and the face 12 is constituted, for example, by the face that is to face towards the outside of the vehicle.

In the inside space E of the element, and more precisely on its longitudinal middle axis, there extends a detonating cord 2 which is preferably similar in length to the element 1. In a variant embodiment (not shown), it is possible to use two cords placed in parallel.

Instead of a detonating cord, it is also possible to use a deflagrating cord, thereby generating not only a pressure wave, but also gas suitable for pressurizing the structure.

Said space E is filled with a solid filler material, such as a polymer, a granular medium, or a foam.

Examples of such substances are respectively a matrix of rubber, sand or silica beads, and a polyurethane foam.

When the cord detonates, the wall is found to deform completely and regularly, i.e. in all directions, given that the cord is centrally located.

The presence of a solid filler material facilitates transmitting the detonation wave to the wall that is to be deformed.

By way of example, the weight of pyrotechnic material constituting the cord is about 1.5 grams (g) and the deformation is obtained in a length of time shorter than 5 milliseconds (ms).

In the embodiment of FIG. 2, the element is similar in shape to that described with reference to FIG. 1.

However in this embodiment the inside surface 11 is covered in a coating 4 made of a mixture of explosive material and a binder. Naturally, the thickness of the deposited coating must be suitable for the thickness of the wall 10 that is to be deformed. Too great a thickness ratio could lead to said wall being perforated.

FIG. 3 shows the element 1 after the coating has exploded. It can be seen that its section has increased considerably.

Naturally, given the initial "bellows" shape of the element, this deformation takes place essentially in its thickness direction, i.e. transversely relative to the faces 12 and 13.

Naturally, the rapid deformation of the element that is obtained with a deflagrating or detonating substance can be associated with producing gas so that said internal space E is pressurized, thereby further increasing the capacity of the element to absorb the energy of an impact. However, and in any event, the gas on its own is not sufficient to ensure that the wall 10 deforms in a very short length of time, i.e. within a few milliseconds, approximately.

In order to "stiffen" the structure after deformation, it is also possible to envisage integrating therein a blade 20 which, prior to deformation lies parallel to the door capping (i.e. parallel to the faces 12 and 13), and that turns through 90° on deployment. Thus, during the impact, the blade opposes flattening of the capping.

The energy delivered by the deflagration or the detonation enables the metal structure to be deformed plastically. It thus does not tend to return naturally to its initial shape.

In the embodiment shown in FIG. 4, use is also made of a coating 4. This coating covers all of the faces of the element 1, with the exception of the face 13 that faces towards the inside of the car cabin.

As a result, and as shown in FIG. 5, the deformation that is obtained is asymmetrical.

This is particularly appropriate when it is desired to minimize the amount of space occupied inside the cabin by the element, including, and above all, during an impact.

This asymmetrical deformation can also be achieved by reinforcing the side that is not to be deformed.

However, under certain circumstances, the total weight of the element is increased, and that goes against the current trend of making vehicles lighter in weight.

Finally, in the embodiment of FIGS. 6 and 7, use is made of a gas generator 5 of the same general type as those used for inflating an airbag.

Conventionally, in such systems, gas generators are used for inflating and pressurizing a bag of fabric or of any other envelope material. The gas is obtained by combustion of a propellant and/or gas taken from a pressurized container.

However such accumulation of gas takes place too slowly to enable the metal structure to be deformed in a length of time that is compatible with a lateral impact.

The invention consists here in using another physical phenomenon, namely a pressure wave P that serves to deform the structure in a time interval that is sufficiently short.

The additional advantage of such a generator 5 is that it can be used completely safely with pyrotechnic materials that are compatible for use in a vehicle.

The gas generator, or more precisely the "pressure wave generator" is made in such a manner that a maximum amount of energy is conveyed by the pressure wave P and a minimum amount of energy by the gas that forms after the pressure wave.

The structure of the combustion chamber of the generator 5 must enable the highest possible pressures to be achieved so that when the chamber opens it is possible to generate the most highly energetic pressure wave possible.

This pressure wave P is created for the most part by the pressure difference between the combustion chamber and the outside medium, however it may also come from the combustion of the propellant.

In a variant of the invention, it is possible to use a medium other than air for improving the transport of the wave within the metal structure. The medium may be solid, e.g. a polymer, a porous material, or a granular medium, or a liquid medium. It could also be constituted by a gas that has higher density than ambient air.

When the vehicle is subjected to a lateral impact, an electrical signal transmitted to the gas generator initiates it. The propellant burns inside the combustion chamber and enables its internal pressure to be increased. The cover of the generator then opens at a defined pressure and releases the gas into the door capping. The pressure difference generates a pressure wave P that moves through the medium (solid, liquid, or gaseous as described above) and comes to deform the structure.

The method of the invention and the device of the invention can be applied to any other structure, such as longitudinal side members of the vehicle, metal casings for a pelvis restrain cushion (PRC) i.e. a device to prevent a passenger sliding under a seat belt, etc.

The main advantages of such a device and method are as follows: it is possible to use a propellant that complies with standards for pyrotechnic substances suitable for use in a vehicle; the capacity of the vehicle is increased, by using door capping that is compact in its initial state; the door capping is deformed quickly, thereby rapidly increasing its second moment of area, in a manner that is compatible with the length of time available between detecting an impact and the capping being stressed thereby; it is possible to target deformation of the metallic structure; and the deformation of the metallic structure is geometrically optimized.

The invention claimed is:

1. An arrangement for reinforcing a hollow structural element of a motor vehicle in combination with the structural element, the structural element having a closed right section defining an inside space and at least one end having an opening, the arrangement including an energy wave generator that generates an energy wave upon detection of a vehicle impact, the energy wave adapted to deform the structural element by increasing a sectional area of the element and escaping the structural element at the opening to avoid deforming the structural element via an increase in pressure within the structural element.

2. The arrangement according to claim 1, wherein the arrangement includes a pyrotechnic material.

3. The arrangement according to claim 2, wherein the pyrotechnic material is an explosive coating applied to an inside surface of the structural element.

4. The arrangement according to claim 1, further comprising a blade for stiffening the hollow structural element after the hollow structural element has deformed.

5. In a structural element of a motor vehicle including an interior space, a reinforcement apparatus comprising:
   a device disposed within the interior space and operable to generate a shock wave in response to a vehicle impact event to deform the structural element; and
   a blade for stiffening the structural element after the structural element has deformed, the blade moving from a first position substantially parallel to a wall of the structural element prior to deformation of the structural element to a second position substantially perpendicular to the wall of the structural element following deformation of the structural element.

6. The structural element according to claim 5, wherein the device includes a pyrotechnic material.

7. The structural element according to claim 6, wherein the pyrotechnic material includes one of a cord and an explosive coating applied to a surface of the structural element.

8. An arrangement for reinforcing a structural element of a motor vehicle in combination with the structural element, the structural element defining an inside space and at least one end having an opening, the arrangement including an energy wave generator that generates an energy wave upon detection of a vehicle impact to deform the structural element by increasing a sectional area of the structural element, the energy wave escaping the structural element at the opening to avoid deforming the structural element via an increase in pressure within the structural element.

9. The arrangement according to claim 8, wherein the arrangement includes a pyrotechnic material.

10. The arrangement according to claim 9, wherein the pyrotechnic material is an explosive coating applied to an inside surface of the structural element.

11. The arrangement according to claim 8, further comprising a blade for stiffening the hollow structural element after the hollow structural element has deformed.

* * * * *